Oct. 6, 1959 D. M. KEENER 2,907,201
HORIZONTAL SHOCK MACHINE
Filed Aug. 28, 1956

INVENTOR.
DALE M. KEENER

BY

*H. H. Losche*
ATTORNEYS

2,907,201
HORIZONTAL SHOCK MACHINE

Dale M. Keener, Indianapolis, Ind., assignor to the United States of America as represented by the Secretary of the Navy Application August 28, 1956, Serial No. 606,786

1 Claim. (Cl. 73—12)

(Granted under Title 35, U.S. Code (1952), sec. 266)

The invention described herein may be manufactured and used by or for the Government of the United States of America for governmental purposes without the payment of any royalties thereon or therefor.

This invention relates to a shock machine that applies force in a horizontal direction and more particularly relates to a shock machine that can readily be adapted to various time durations.

Uniform procedures have been established for the testing of various components such as electronic equipment, and military equipment, in particular, is required to be subjected to various tests, one of which is a shock test. These military specifications are designed to determine the structural integrity of the equipment under conditions of shock as well as the crash safety of mounting bases and other holding devices. Many military specifications specify both the intensity of the shock and the time duration. For example, a piece of electronic equipment might be subjected to 18 impact shocks of 15 times gravity, or 15 G, and a time duration of $11\pm1$ milliseconds, with maximum gravity reached in approximately 5½ milliseconds.

Heretofore, known shock machines have not been able to accurately repeat the time duration of shock and thus test results were difficult to interpret. Often elaborate pneumatic or hydraulic machines were used wherein the control of the shock pulses depended upon the flow of fluid through various metering orifices, and even these machines could not consistently repeat the desired time durations of shock.

The shock machine described herein shows a novel horizontal shock machine that can consistently repeat the magnitude and time duration of shock. A mounting table is pivotally connected to a framework and can be swung in pendulum fashion. An anvil is mounted to the mounting table and is adapted to strike a flat metallic spring that is attached to the framework. The item that is to be subjected to test is secured to the top of the mounting table and the table is then swung in an arc a predetermined number of degrees, and upon release, the mounting table will swing back and the anvil will strike the flat metallic spring. The anvil and spring are so positioned that the striking will take place at the lowestmost position and the force will thus be applied in a horizontal direction parallel with the base of the machine. The duration and intensity of the shock is determined by the spring characteristics and the kinetic energy of the mounting table.

It is therefore a general object of the present invention to provide a horizontal type shock machine wherein the time of duration of the shock can be controlled and consistently repeated.

Other objects and many of the attendant advantages of this invention will be readily appreciated as the same becomes better understood by reference to the following detailed description when considered in connection with the accompanying drawing wherein.

Figure 1:
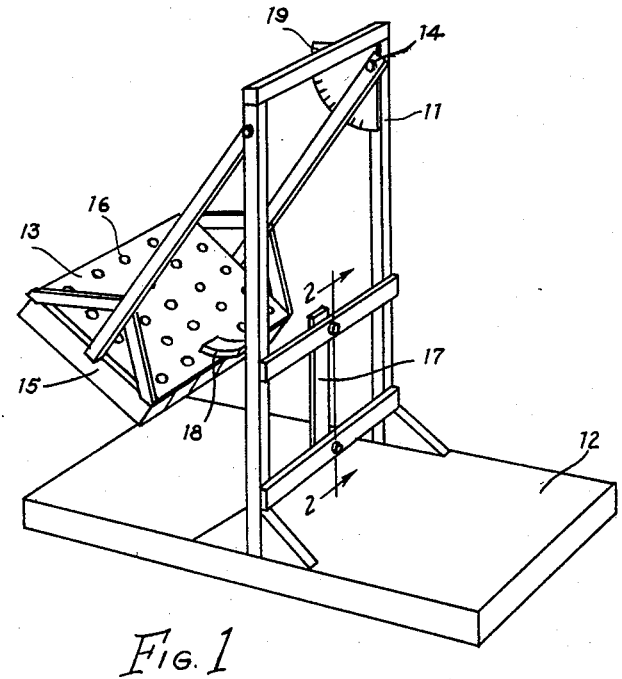
Figure 1 is a perspective view showing a preferred embodiment of the invention.

Referring now to the drawing, there is shown in Figure 1 an upstanding frame 11 that is attached to a base 12. A mounting table 13 is pivotally attached to the frame 11 by any suitable means 14 as, by example, shafts and bearings. Detachable weights 15 can be attached to the underside of the mounting table 13 in order to control the degree of impact. The top surface of mounting plate 13 is provided with a plurality of holes 16 to facilitate fastening of objects thereon.

Figure 2:
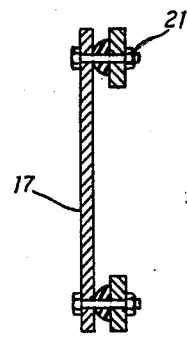
Figure 2 is a sectional view taken on line 2—2 of Figure 1.

As shown in Figures 1 and 2 of the drawing, a flat metallic spring 17 is attached to the frame 11, and a striker plate 18 that is attached to the mounting table is positioned such that it will strike spring 17. The metallic spring 17 is readily removable so that different sizes and thicknesses of plates can be provided in order to control the time duration of shock. As the stiffness of metallic spring 17 is increased, the time duration of shock is decreased.

A suitable scale 19 is attached to the frame 11 and provides a convenient way of determining the length of arc that the mounting table 13 will swing through before the striker plate 18 will strike the spring 17.

Figure 3:
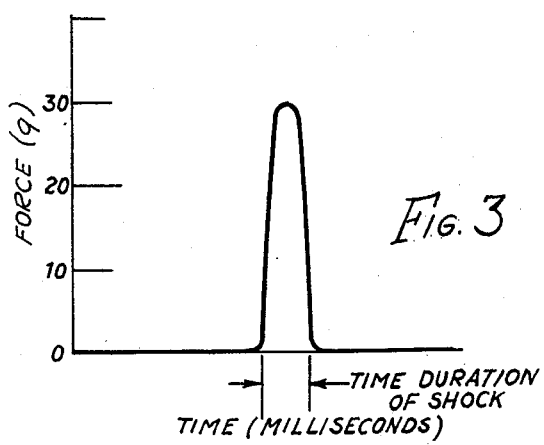
Figure 3 is a graph showing the intensity and time duration of shock applied by the shock machine described herein.

In operation, a spring 17 with the desired degree of stiffness is chosen, and is then mounted to the frame 11 by any suitable means such as screws 21. The equipment to be tested is secured to the mounting table 13 by any suitable means. The mounting table 13 is then pivoted a predetermined number of degrees, using the scale 19 as a guide and, upon release, the table will swing downwardly with the striker plate 18 striking the spring 17. Figure 3 shows the pattern of the shock obtained, and this pattern can readily be produced on graph paper by means of an accelerometer and suitable recording equipment. If the intensity of the shock is too low, it can be increased by either changing the mass of the weights 15 or by increasing the arc through which the mounting table is pivoted. The time duration of shock can be controlled by changing the springs 17, that is, a stiffer spring will shorten the time duration of the shock.

Obviously many modifications and variations of the present invention are possible in the light of the above teachings. It is therefore to be understood that the invention may be practiced otherwise than as specifically described.

What is claimed is:

A horizontal shock machine comprising, a base, a frame rigidly connected to said base, a mounting table having a plurality of holes therein, a single pair of rigid arms pivotally attaching said mounting table to the top of said frame, gauge means on said frame for measuring the angle of pivot of said mounting table, a striker plate rigidly connected to said table, and a flat leaf spring having the longitudinal axis mounted perpendicular to said base and removably attached to said frame for stopping said mounting table during travel whereby said striker plate strikes said flat leaf spring.

References Cited in the file of this patent

UNITED STATES PATENTS

| | | |
|---|---|---|
| 433,783 | Greaves | Aug. 5, 1890 |
| 2,498,844 | Sears et al. | Feb. 28, 1950 |
| 2,518,350 | McCormick | Aug. 8, 1950 |